(12) United States Patent
Nishimura

(10) Patent No.: US 11,155,457 B2
(45) Date of Patent: Oct. 26, 2021

(54) SUPPLY CONTROL APPARATUS, SUPPLY DEVICE, SUPPLY CONTROL METHOD, AND PROGRAM

(71) Applicant: NEC Corporation, Tokyo (JP)

(72) Inventor: Tomoyuki Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 16/495,348

(22) PCT Filed: Feb. 20, 2018

(86) PCT No.: PCT/JP2018/006085
§ 371 (c)(1),
(2) Date: Sep. 18, 2019

(87) PCT Pub. No.: WO2018/173599
PCT Pub. Date: Sep. 27, 2018

(65) Prior Publication Data
US 2021/0114861 A1  Apr. 22, 2021

(30) Foreign Application Priority Data

Mar. 21, 2017 (JP) .............................. JP2017-055027

(51) Int. Cl.
*B67D 7/34* (2010.01)
*B67D 7/32* (2010.01)
(Continued)

(52) U.S. Cl.
CPC ............. *B67D 7/34* (2013.01); *B67D 7/3281* (2013.01); *B67D 7/426* (2013.01); *G06F 3/0482* (2013.01); *B67D 2007/329* (2013.01)

(58) Field of Classification Search
CPC ........ B67D 7/34; B67D 7/3281; B67D 7/426; B67D 2007/329; B67D 7/32; B67D 7/42; G06F 3/0482; G06F 3/0484
See application file for complete search history.

(56) References Cited

U.S. PATENT DOCUMENTS

| 7,481,105 | B2 * | 1/2009 | Schillinger | ......... G01F 23/2962 73/290 B |
| 8,627,858 | B2 * | 1/2014 | Elwart | ................... B60K 15/03 141/83 |

(Continued)

FOREIGN PATENT DOCUMENTS

| JP | 07-315496 A | 12/1995 |
| JP | 10-077098 A | 3/1998 |

(Continued)

OTHER PUBLICATIONS

Communication dated May 20, 2020, from the European Patent Office in application No. 18772488.5.

(Continued)

*Primary Examiner* — Jung-Mu T Chuang
(74) *Attorney, Agent, or Firm* — Sughrue Mion, PLLC

(57) ABSTRACT

A supply control apparatus includes a display information output unit configured to output display information to allow a user to recognize an identifier of a supply object and information to prompt the user to decide on the supply object when the supply object is supplied to a supply destination container and a supply control unit configured to remove a supply limit for the supply destination container of the supply object when a decision operation in which the user confirming the display information decides on the supply object is detected.

10 Claims, 11 Drawing Sheets

(51) Int. Cl.
*B67D 7/42* (2010.01)
*G06F 3/0482* (2013.01)

(56) References Cited

U.S. PATENT DOCUMENTS

| | | | | |
|---|---|---|---|---|
| 9,217,402 | B2* | 12/2015 | Dudar | F02M 35/10229 |
| 10,207,912 | B2* | 2/2019 | Nelson | G05B 15/02 |
| 2003/0075600 | A1* | 4/2003 | Struthers | G07F 9/00 235/381 |
| 2010/0230001 | A1* | 9/2010 | Elwart | B60K 15/03 141/35 |
| 2011/0320953 | A1* | 12/2011 | Chen | G09G 5/397 715/738 |
| 2012/0095643 | A1* | 4/2012 | Bose | B60K 37/00 701/32.8 |
| 2014/0096057 | A1* | 4/2014 | Marston | B67D 7/02 715/771 |
| 2014/0122757 | A1* | 5/2014 | Barrett | G06F 13/4045 710/107 |
| 2014/0200762 | A1* | 7/2014 | Shaw | B60K 35/00 701/36 |
| 2014/0216563 | A1* | 8/2014 | Dudar | B60K 15/03504 137/15.04 |
| 2015/0242855 | A1* | 8/2015 | Vilnai | G07F 13/025 705/44 |
| 2015/0242969 | A1* | 8/2015 | Pallas | G06Q 50/06 705/39 |
| 2016/0034238 | A1* | 2/2016 | Gerlach | G06F 3/04842 345/1.1 |
| 2016/0130130 | A1* | 5/2016 | Nelson | B67D 7/342 700/283 |
| 2017/0008754 | A1* | 1/2017 | Schweble | B67D 7/346 |
| 2017/0083988 | A1* | 3/2017 | Butsch | G06Q 20/204 |
| 2017/0109722 | A1* | 4/2017 | Morris | G06Q 20/145 |
| 2017/0344233 | A1* | 11/2017 | Martensson | G06F 3/04845 |

FOREIGN PATENT DOCUMENTS

| | | | |
|---|---|---|---|
| JP | 2001206497 | * | 7/2001 |
| JP | 2001206497 | A | 7/2001 |
| JP | 2004345703 | A | 12/2004 |
| JP | 2009-001330 | A | 1/2009 |
| JP | 2009-223490 | A | 10/2009 |
| JP | 2009223490 | * | 10/2009 |
| WO | 2015117679 | A1 | 8/2015 |
| WO | 2016073267 | A1 | 5/2016 |

OTHER PUBLICATIONS

International Search Report for PCT/JP2018/006085 dated Apr. 17, 2018 [PCT/ISA/210].

* cited by examiner

SUPPLY CONTROL APPARATUS, SUPPLY DEVICE, SUPPLY CONTROL METHOD, AND PROGRAM

CROSS REFERENCE TO RELATED APPLICATIONS

This application is a National Stage of International Application No. PCT/JP2018/006085 filed Feb. 20, 2018, claiming priority based on Japanese Patent Application No. 2017-055027 filed Mar. 21, 2017.

TECHNICAL FIELD

The present invention relates to a supply control apparatus, a supply device, a supply control method, and a program.

BACKGROUND ART

Technology for detecting whether or not an erroneous supply object has been supplied when a supply object is being supplied to a supply destination is disclosed in Patent Literature 1. The technology of Patent Literature 1 is used to determine a type of oil when fuel oil such as gasoline as a supply object is supplied to a refueling tank and prevent erroneous refueling.

CITATION LIST

Patent Literature

[Patent Document 1]
Japanese Unexamined Patent Application, First Publication No. H7-315496

SUMMARY OF INVENTION

Problem to be Solved by the Invention

In the above-described technology, a type of highly volatile fuel oil may not be correctly recognized when a type of oil is detected by a sensor. Thus, there is a need for a technology that more accurately reduces the number of operations in which an unintended supply object is supplied to a container of a supply destination due to not paying attention.

Therefore, an objective of the present invention is to provide a supply control apparatus, a supply device, a supply control method, and a program capable of solving the above-described problem.

Means for Solving the Problems

In order to solve the above-described problem, an aspect of the present invention is a supply control apparatus including: a display information output unit configured to output display information to allow a user to recognize an identifier of a supply object and information to prompt the user to decide on the supply object when the supply object is supplied to a supply destination container; and a supply control unit configured to remove a supply limit for the supply destination container of the supply object when a decision operation in which the user confirming the display information decides on the supply object is detected.

Another aspect of the present invention is a supply device including the supply control apparatus.

Another aspect of the present invention is a supply control method including: outputting display information to allow a user to recognize an identifier of a supply object and information to prompt the user to decide on the supply object when the supply object is supplied to a supply destination container; and removing a supply limit for the supply destination container of the supply object when a decision operation in which the user confirming the display information decides on the supply object is detected.

Another aspect of the present invention is a program that causes a computer of a supply control apparatus to execute the processes of: outputting display information to allow a user to recognize an identifier of a supply object and information to prompt the user to decide on the supply object when the supply object is supplied to a supply destination container; and removing a supply limit for the supply destination container of the supply object when a decision operation in which the user confirming the display information decides on the supply object is detected.

Advantageous Effects of Invention

According to the present invention, it is possible to reduce the number of operations in which an unintended supply object is supplied to a container of a supply destination due to the carelessness of a person.

DESCRIPTION OF EMBODIMENTS

Hereinafter, embodiments will be described with reference to the drawings.

First Embodiment

Figure 1:
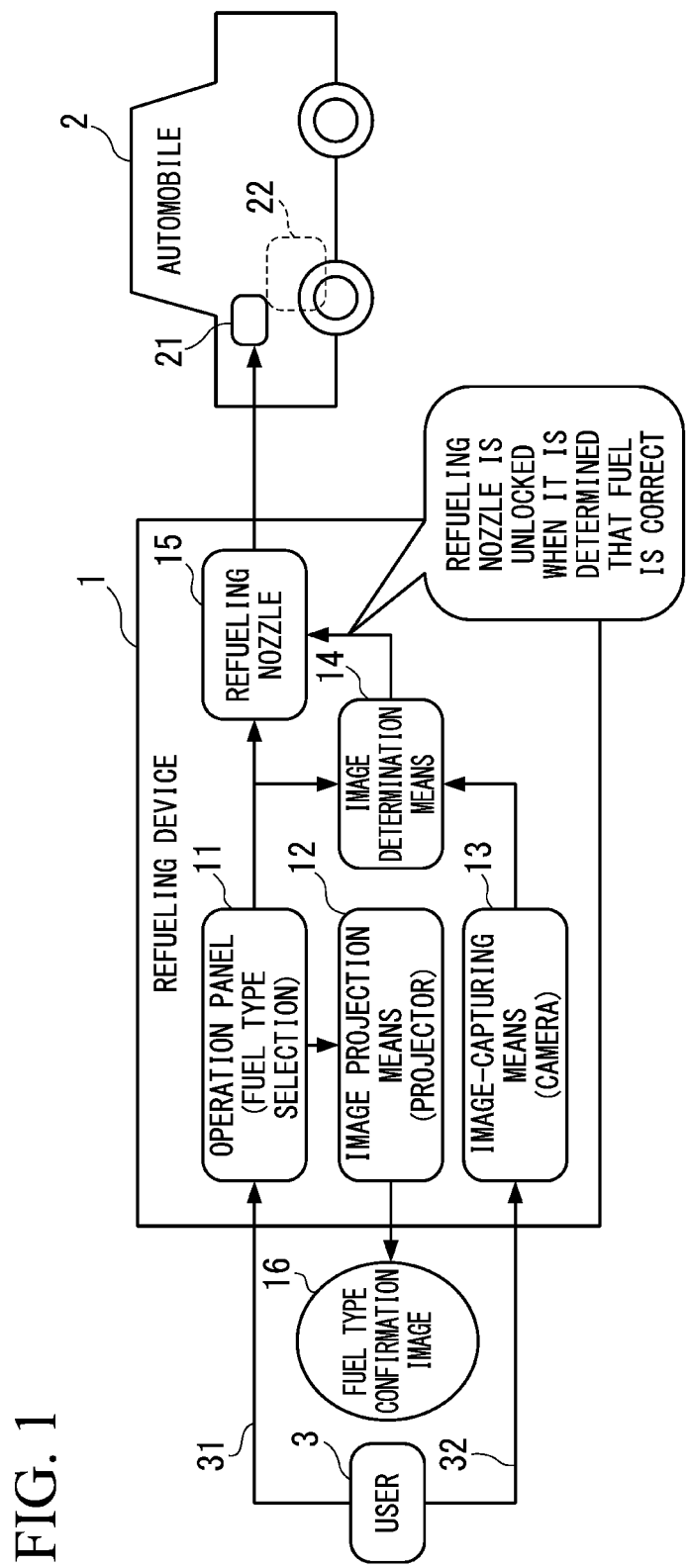
FIG. 1 is a configuration diagram showing an example of a refueling device according to a first embodiment.

FIG. 1 is a block diagram showing an example of a refueling device according to a first embodiment. A refueling device 1 shown in FIG. 1 is also referred to as a gasoline measurement device, a fixed refueling facility, or the like.

The refueling device 1 is installed at a self-service type gas station or the like and used when a user 3 refuels an automobile 2 with fuel oil. The refueling device 1 includes an operation panel 11, an image projection means 12, an image-capturing means 13, an image determination means 14, a refueling nozzle 15, and the like. The refueling device 1 supplies a plurality of types of fuel oil including gasoline and diesel. The refueling device 1 includes a refueling pump for sucking up fuel oil from an underground storage tank (not shown), a flowmeter, an indicator for indicating a measurement value of the flowmeter or the like, an electromagnetic valve inserted between the refueling pump and the flowmeter, and the like. The refueling device 1 locks (stops) refueling of fuel oil from the refueling nozzle 15 by stopping the refueling pump or closing the electromagnetic valve. The refueling device 1 unlocks refueling from the refueling nozzle 15 by activating the refueling pump or opening the electromagnetic valve.

The operation panel 11 is, for example, a liquid crystal touch panel. The operation panel 11 receives an operation 31 such as a fuel type selection operation of the user 3 and outputs operation information indicating details of the received operation 31 to the image projection means 12, the image determination means 14, and the refueling nozzle 15. The operation panel 11 outputs, for example, information indicating the selected type of fuel to the image projection means 12, the image determination means 14, and the refueling nozzle 15.

The image projection means 12 is a projector configured to include, for example, a video element such as a digital micro mirror device (DMD) and a light source such as a light-emitting diode (LED). The image projection means 12 generates and projects a fuel type confirmation image 16 on the basis of operation information according to the fuel type selection operation 31 input from the operation panel 11.

Figure 2:
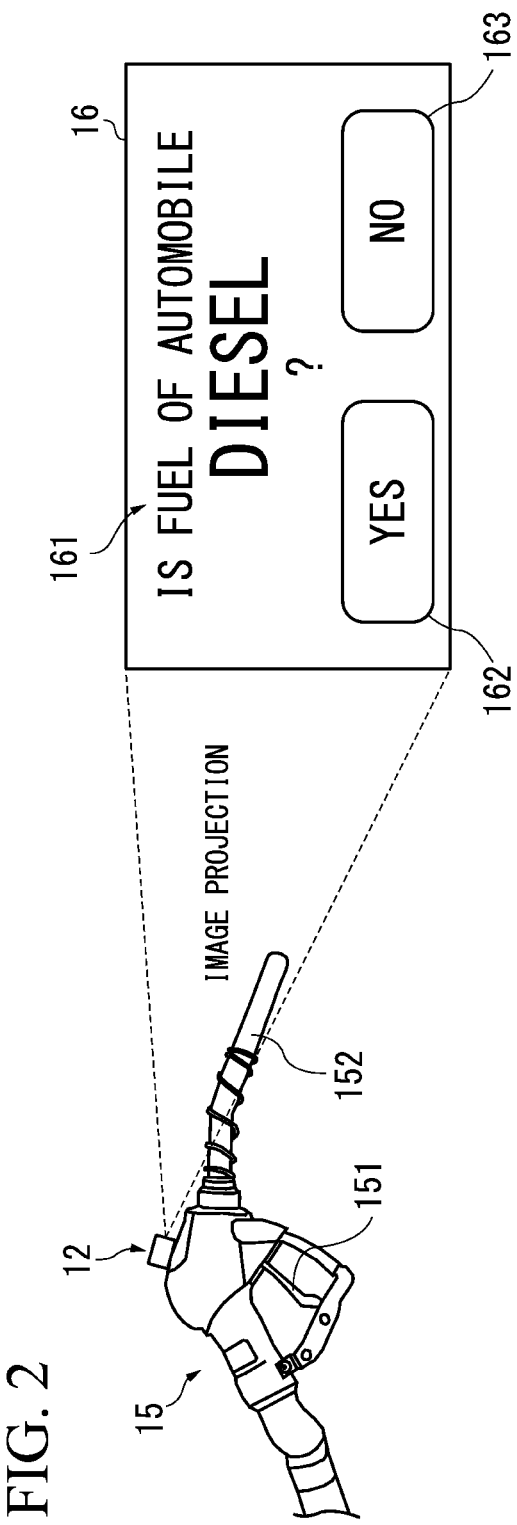
FIG. 2 is a schematic diagram showing an example of a fuel type confirmation image shown in FIG. 1.

FIG. 2 is a schematic diagram showing an example of the fuel type confirmation image 16 shown in FIG. 1. The image projection means 12 is provided, for example, on the refueling nozzle 15. For example, when the user 3 brings the refueling nozzle 15 close to a refueling port 21 of the automobile 2, the image projection means 12 projects the fuel type confirmation image 16 on an automobile body in the vicinity of the refueling port 21. The example shown in FIG. 2 shows an example of the fuel type confirmation image 16 when diesel has been selected by the fuel type selection operation 31 of the user 3. In this case, the fuel type confirmation image 16 includes decision-prompting information 161 relative to the selected type of fuel "diesel" and decision indication information 162 and denial indication information 163 that are operation objects of an operation 32 according to the action (motion) of the user 3. Here, the type of fuel represents a type of fuel oil and examples thereof include diesel, regular gasoline, high-octane gasoline, kerosene, and the like. In this case, the decision-prompting information 161 includes text information indicating "diesel" that is an identifier of the supply object. The decision indication information 162 is an object of an operation of deciding on the type of fuel. In this case, the decision indication information 162 is a button display including text "Yes". The denial indication information 163 is an object of an operation to deny the type of fuel. In this case, the denial indication information 163 is a button display including text "No".

The image-capturing means 13 shown in FIG. 1 is configured to include, for example, a camera. The image-capturing means 13 photographs the operation 32 according to the action of the user 3 on the fuel type confirmation image 16 and outputs the captured image information to the image determination means 14.

For example, the image determination means 14 is configured using a computer (not shown) that controls the parts within the refueling device 1 and executes the following process by executing a prescribed program in the computer. That is, the image determination means 14 inputs information about an image captured by the image-capturing means 13 and performs a process such as a prescribed image recognition process on the input image information. The image determination means 14 determines that the operation 32 of the user 3 to decide on a type of fuel has been performed when the input image information includes the operation 32 of the user 3 such as pointing, touching with his/her finger or hand, or viewing to designate, for example, the decision indication information 162 within the fuel type confirmation image 16 shown in FIG. 2, as an object. That is, the image determination means 14 detects an operation of the user 3 with respect to decision indication information (decision button display) 162 to prompt the user to decide on a type of fuel included in the fuel type confirmation image 16 projected in the vicinity of the refueling port 21 (a supply destination container) as a decision operation.

On the other hand, when the input image information includes the operation 32 of the user 3 such as pointing, touching with his/her finger or hand, or viewing to designate, for example, the denial indication information 163 within the fuel type confirmation image 16 shown in FIG. 2, as an object, the image determination means 14 determines that the operation 32 of the user 3 to deny the type of fuel has been performed. For example, the image determination means 14 outputs, to the refueling nozzle 15, a signal indicating the unlocking of the refueling nozzle 15 on the basis of a determination result.

As shown in FIG. 2, the refueling nozzle 15 opens an internal main valve by gripping a lever 151 and performs refueling with fuel oil from the nozzle pipe 152. For example, the user 3 inserts a nozzle pipe 152 into the refueling port 21 of the automobile 2 shown in FIG. 1 and grips the lever 151 after performing a confirmation operation on the fuel type confirmation image 16. Thereby, the user 3 can perform refueling (fuel feeding) from the refueling nozzle 15 to a fuel tank 22. In the present embodiment, the refueling nozzle 15 may include the following control unit. That is, a control unit provided in the refueling nozzle 15 is configured using a computer (not shown) that controls the parts within the refueling device 1 as in the image determination means 14 and executes the following process by executing a prescribed program in the computer. That is, the control unit provided in the refueling nozzle 15 performs control for locking (stopping) of the refueling with the fuel oil from the refueling nozzle 15 by stopping the refueling pump or closing the electromagnetic valve on the basis of an output signal of the image determination means 14. The control unit provided in the refueling nozzle 15 performs control for unlocking the refueling from the refueling nozzle 15 by activating the refueling pump or opening the electromagnetic valve.

Figure 3:
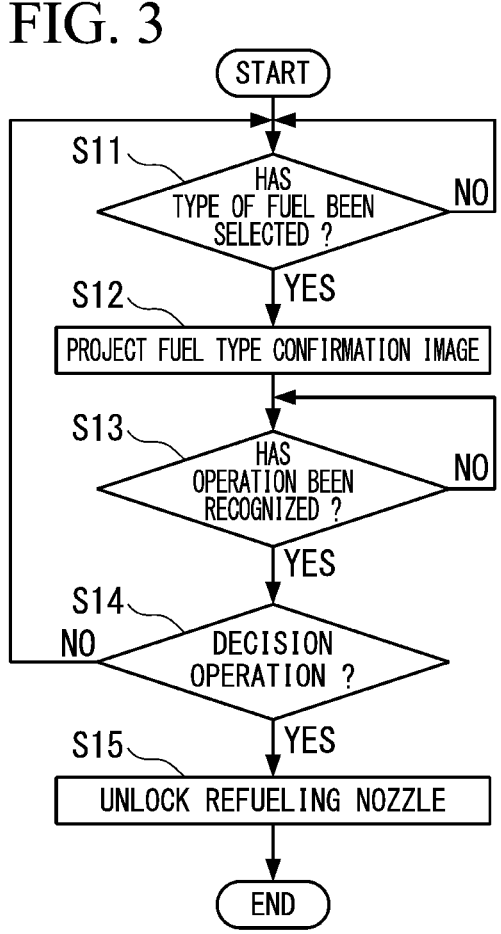
FIG. 3 is a flowchart showing an operation example of the refueling device shown in FIG. 1.

Next, an example of an operation of the refueling device 1 shown in FIG. 1 will be described with reference to FIG. 3. The flowchart shown in FIG. 3 shows a flow of a process executed by the refueling device 1 until the refueling nozzle 15 is unlocked after the user 3 selects the type of fuel by operating the operation panel 11. The process shown in FIG. 3 is started in a state in which the refueling nozzle 15 is locked. In the process shown in FIG. 3, the operation panel 11 first waits until the user 3 performs the operation 31 of selecting the type of fuel (the iteration of "NO" in step S11). When the operation panel 11 selects the type of fuel in accordance with the operation 31 of the user 3 ("YES" in step S11), the image projection means 12 projects a fuel type confirmation image 16 indicating the selected type of fuel (step S12).

Next, the image determination means 14 waits until the prescribed operation 32 on the fuel type confirmation image 16 according to the action of the user 3 is recognized on the basis of information about an image captured by the image-capturing means 13 (the iteration of "NO" in step S13). When the prescribed operation 32 on the fuel type confirmation image 16 according to the action of the user 3 is recognized ("YES" in step S13), the image determination means 14 determines whether or not the prescribed operation 32 on the fuel type confirmation image 16 according to the action of the user 3 is a decision operation (step S14). When the operation 32 according to the action of the user 3 on the fuel type confirmation image 16 is the decision operation (the case of "YES" in step S14), the image determination means 14 unlocks the refueling nozzle 15 (step S15). On the other hand, when the image determination means 14 determines that the operation 32 according to the action of the user 3 on the fuel type confirmation image 16 is not the decision operation (the case of "NO" in step S14), the operation panel 11 waits for the fuel type selection operation to be input again (step S11).

Figure 4:
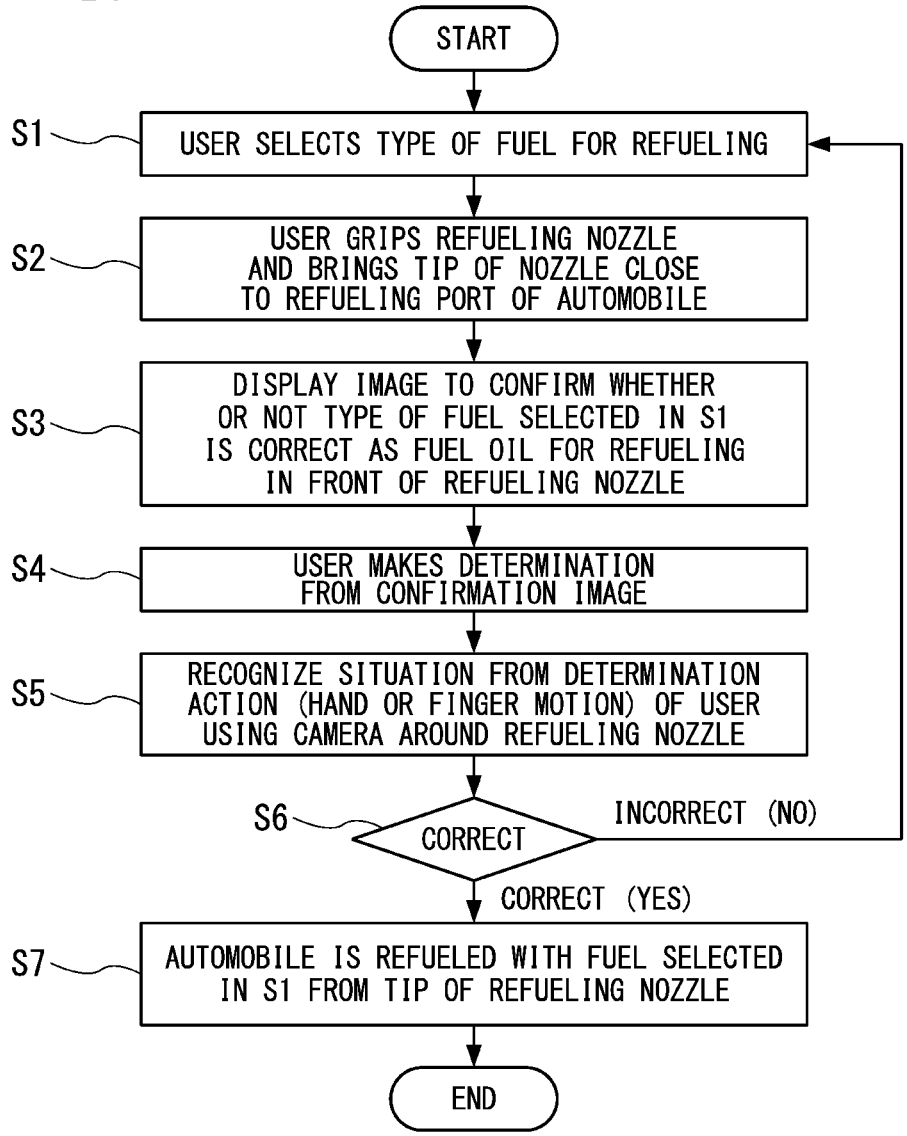
FIG. 4 is a flowchart showing an example of use of the refueling device shown in FIG. 1.

Next, an example of use of the refueling device 1 will be described with reference to FIG. 4. FIG. 4 is a flowchart showing an example of use of the refueling device 1 by the user 3. First, the user 3 operates the operation panel 11 to select the type of fuel for refueling (step S1). Next, the user 3 grips the refueling nozzle 15 and brings the tip of the nozzle pipe 152 close to the refueling port 21 of the automobile 2 (step S2). Next, the image projection means 12 displays a fuel type confirmation image 16 to confirm whether or not the type of fuel selected in step S1 is correct as the fuel oil for refueling in front of the refueling nozzle 15 (step S3). Next, the user 3 determines whether or not the type of fuel is correct on the basis of the fuel type confirmation image 16 (step S4). Next, the image determination means 14 recognizes a situation (an operation situation) from a determination action (hand or finger motion) of the user 3 on the basis of a camera image around the refueling nozzle 15 (step S5).

Next, when the image determination means 14 determines that the recognition result is the decision operation (the case of "YES" in step S6), the automobile 2 is refueled with the fuel oil selected in step S1 from the tip of the refueling nozzle 15 (step S7). That is, when the user 3 determines that the type of fuel is correct, refueling is performed. On the other hand, when the image determination means 14 determines that the recognition result is not the decision operation (the case of "NO" in step S6), the process is performed from step S1. That is, when the user 3 determines that the type of fuel is incorrect, the process returns to step S1.

As described above, according to the present embodiment, when fuel oil is supplied to the fuel tank 22, the image projection means 12 outputs the fuel type confirmation image 16 to allow the user 3 (the user) to recognize the selected type of fuel and decision-prompting information 161 with respect to the type of fuel. That is, the image projection means 12 outputs the fuel type confirmation image 16 including an identifier of the fuel oil of the type of fuel selected from a plurality of types of fuel and decision button display to prompt the user to decide on the fuel oil. When an operation (a decision operation) in which the user 3 confirming the fuel type confirmation image 16 decides on the type of fuel has been detected, the image determination means 14 removes a supply limit for the fuel tank 22 of fuel oil of the type of fuel.

As described above, in the present embodiment, the decision operation on the fuel type confirmation image 16 is set as a requirement for unlocking. Thus, it is possible to reduce the number of erroneous operations in which unintended fuel oil is supplied to the fuel tank 22 due to the carelessness of a person.

In the present embodiment, the refueling device 1 is an example of a supply device and is also an example of a supply control apparatus. The image projection means 12 is an example of a display information output unit. The image determination means 14 is an example of a supply control unit and a user operation detection unit. The fuel type confirmation image 16 is an example of display information. The fuel tank 22 is an example of a supply destination container and is an example of a tank mounted in a vehicle. The fuel oil is an example of a supply object. The decision indication information 162 is an example of decision button display.

Figure 13:
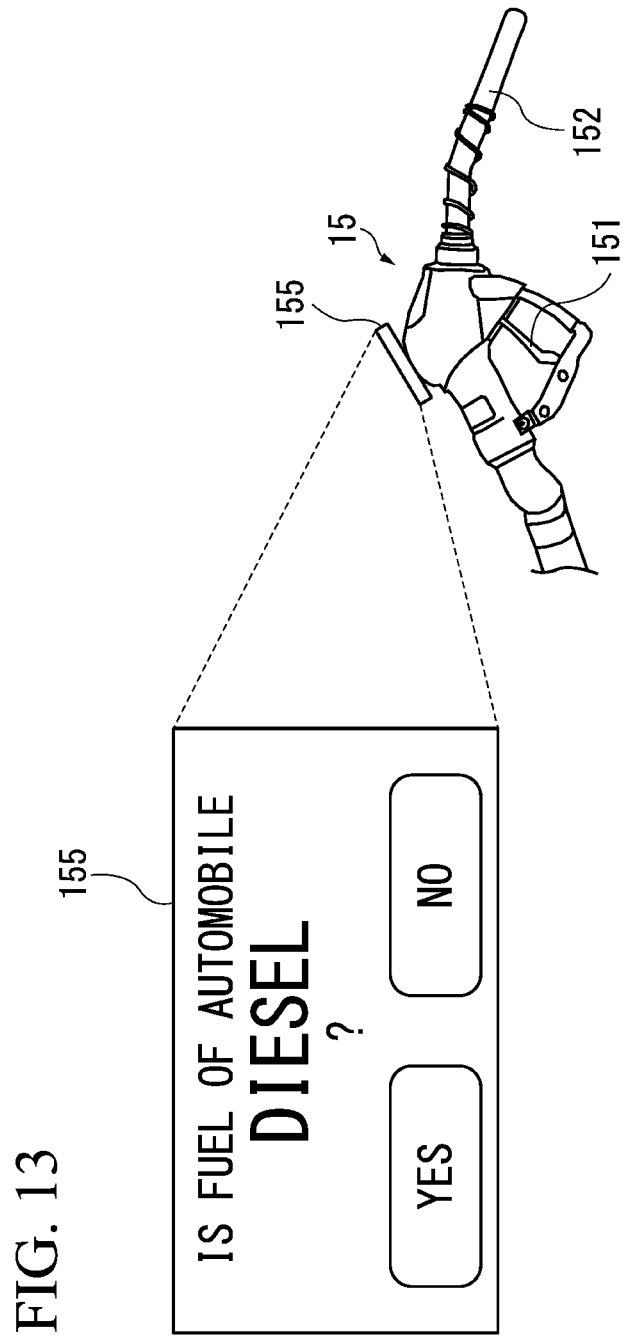
FIG. 13 is a schematic diagram showing an example of the fuel type confirmation image shown in FIG. 1.

The image projection means 12 is not limited to a projector and may be, for example, a display/input apparatus 155 with a touch panel installed near the refueling nozzle 15 (see FIG. 13). In this case, the refueling device 1 can display the fuel type confirmation image 16 on the touch panel and unlock the refueling nozzle 15 when a touch operation on the decision indication information 162 that is the decision button display has been detected. The decision operation on the fuel type confirmation image 16 may be an operation of pushing a dedicated button for decision. In this case, for example, the dedicated button can be installed near the refueling nozzle 15. That is, the refueling device 1 detects an operation of the user 3 on the decision indication information (decision button display) 162 to prompt the user 3 to decide on the type of fuel included in the fuel type confirmation image 16 displayed on the touch panel as a decision operation.

The refueling device 1 may include a decision information recording unit configured to record decision information (decision operation information) indicating that the user 3 has performed an operation of deciding on the type of fuel (a supply object) using the fuel type confirmation image 16 (display information). The decision information may be, for example, text information indicating the presence or absence of the decision operation or information about an image captured at the time of the decision operation. For example, the decision information recording unit records decision information when the user 3 has performed the decision operation on the decision indication information 162 in the fuel type confirmation image 16 in association with a date or identification information such as a series number printed on a receipt issued at the time of refueling. It is possible to confirm details of a previous decision operation by recording the decision information on the decision information recording unit.

Although the first embodiment is configured as the refueling device 1, the present invention is not limited thereto. For example, the fuel tank 22 may be a mixing container of chemical substances and the like. In this case, the refueling device 1 can be used as a supply control apparatus of chemical substances used when a plurality of types of chemical substances other than fuel oil are mixed.

The image projection means 12 outputs a substance type confirmation image including an identifier of a chemical substance selected from a plurality of types of chemical substances and decision button display to prompt the user to decide on the chemical substance. The image determination means 14 removes a supply limit for a mixing container of a corresponding type of chemical substance when an operation in which the user 3 confirming the substance type confirmation image decides on the type has been detected. At this time, for example, the image determination means 14 detects an operation of the user 3 on the decision button display to prompt the user to decide on the type included in the substance type confirmation image projected near the mixing container as a decision operation.

Second Embodiment

Figure 5:
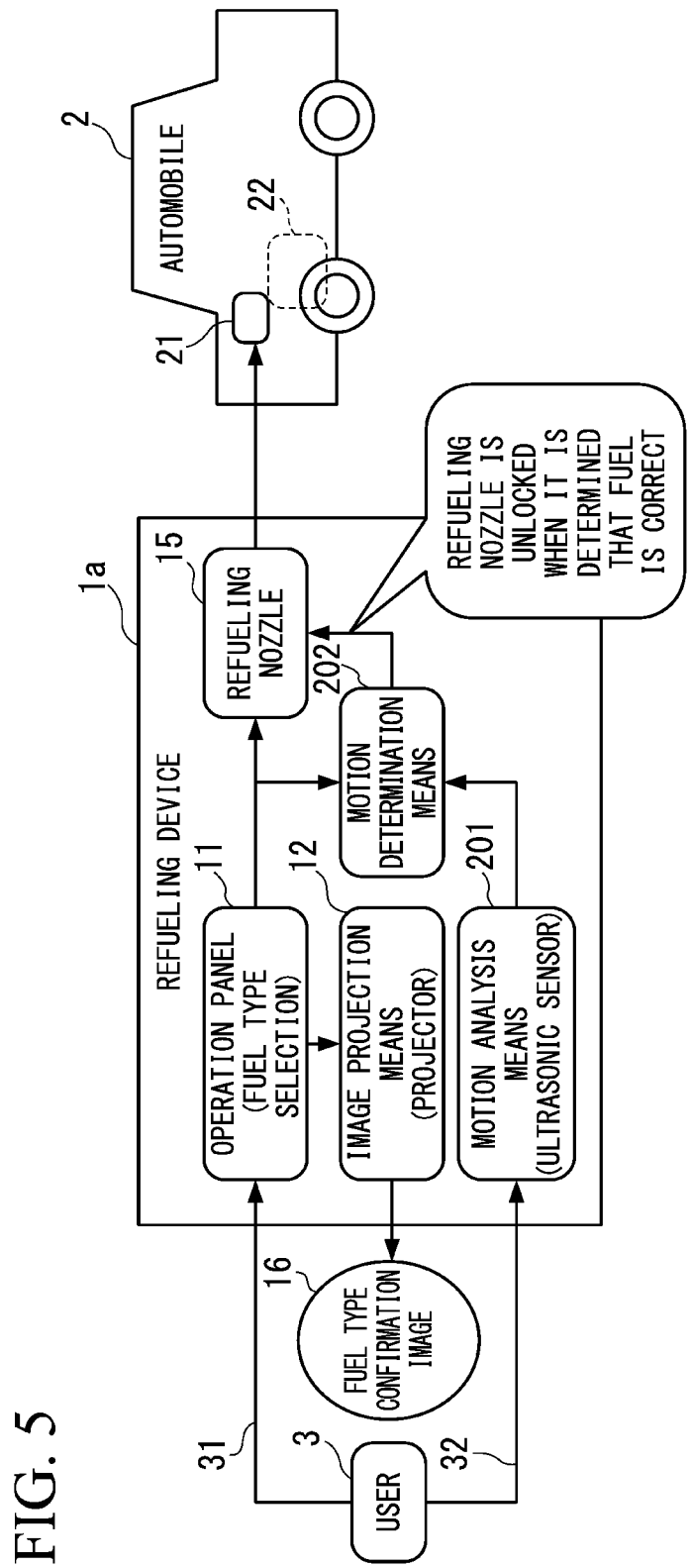
FIG. 5 is a configuration diagram showing an example of a refueling device according to a second embodiment.

FIG. 5 is a block diagram showing an example of a refueling device according to a second embodiment. The same components as those shown in FIG. 1 are denoted by the same reference signs in FIG. 5 and description thereof will be appropriately omitted. A refueling device 1*a* shown in FIG. 5 has the following differences from the refueling device 1 according to the first embodiment shown in FIG. 1. That is, the refueling device 1*a* according to the second embodiment is different from the refueling device shown in FIG. 1 in that a motion analysis means 201 is provided instead of the image-capturing means 13 shown in FIG. 1 and a motion determination means 202 is provided instead of the image determination means 14 shown in FIG. 1.

The motion analysis means 201 is configured to include, for example, an ultrasonic sensor. The motion analysis means 201 measures distances between the user 3 and a plurality of points around the user 3 and outputs detected distance information to the motion determination means 202. Alternatively, the motion analysis means 201 includes, for example, an infrared light radiation unit that randomly radiates a plurality of dots and an infrared light-imaging unit that photographs reflected light of the radiated infrared light. In this case, the motion analysis means 201 generates distance image information in which distance information is added for each pixel on the basis of a deviation of a position according to the distance of each dot projected to the user 3 and outputs the distance image information to the motion determination means 202.

The motion determination means 202 is configured using a computer (not shown) that controls the parts within the refueling device 1 and executes a prescribed program in the computer. Accordingly, the motion determination means 202 inputs the distance information generated by the motion analysis means 201 and performs a prescribed motion recognition process on the basis of the input distance information. For example, the motion determination means 202 extracts an outline of the user 3, for example, on the basis of the input distance information, and recognizes a motion of the user 3, for example, on the basis of a motion of an outline and a prescribed pattern change prepared in advance. The motion determination means 202 determines that the operation 32 of the user 3 to decide on a type of fuel has been performed when the recognized action of the user 3 corresponds to the operation 32 of the user 3 such as pointing or touching with his/her finger or hand to designate, for example, the decision indication information 162 within the fuel type confirmation image 16 shown in FIG. 2, as an object. On the other hand, the motion determination means 202 determines that the operation 32 of the user 3 to deny a type of fuel has been performed when the recognized action of the user 3 corresponds to the operation 32 of the user 3 such as pointing or touching with his/her finger or hand to designate, for example, the denial indication information 163 within the fuel type confirmation image 16 shown in FIG. 2, as an object. For example, the motion determination means 202 outputs a signal indicating unlocking of the refueling nozzle 15 to the refueling nozzle 15 on the basis of a determination result.

Next, as in the first embodiment, an example of an operation of the refueling device 1*a* shown in FIG. 5 will be described with reference to FIG. 3. As described above, a flowchart shown in FIG. 3 shows a flow of a process executed by the refueling device until the refueling nozzle 15 is unlocked after the user 3 operates the operation panel 11 and selects a type of fuel. The process shown in FIG. 3 is started in a state in which the refueling nozzle 15 has been locked. In the process shown in FIG. 3 in the second embodiment, the operation panel 11 first waits until the user 3 performs the operation 31 to select the type of fuel (the iteration of "NO" in step S11). When the operation panel 11 selects a type of fuel in accordance with the operation 31 of the user 3 ("YES" in step S11), the image projection means 12 projects the fuel type confirmation image 16 indicating the selected type of fuel (step S12).

Next, the motion determination means 202 waits until a prescribed operation 32 on the fuel type confirmation image 16 according to the action of the user 3 is recognized on the basis of distance information detected by the motion analysis means 201 (the iteration of "NO" in step S13). When the prescribed operation 32 on the fuel type confirmation image 16 according to the action of the user 3 is recognized ("YES" in step S13), the motion determination means 202 determines whether or not the prescribed operation 32 on the fuel type confirmation image 16 according to the action of the user 3 is a decision operation (step S14). When the operation 32 on the fuel type confirmation image 16 according to the action of the user 3 is a decision operation (the case of "YES" in step S14), the motion determination means 202 unlocks the refueling nozzle 15 (step S15). On the other hand, when the motion determination means 202 determines that the operation 32 on the fuel type confirmation image 16 according to the action of the user 3 is not the decision operation (the case of "NO" in step S14), the operation panel 11 waits for the fuel type selection operation to be input again (step S11).

As described above, according to the present embodiment, when fuel oil is supplied to the fuel tank 22, the image projection means 12 outputs a fuel type confirmation image 16 to allow the user 3 (the user) to recognize a selected type of fuel and decision-prompting information 161 with respect to the type of fuel. When an operation in which the user 3 confirming the fuel type confirmation image 16 decides on the type of fuel has been detected, the motion determination means 202 removes a supply limit of the fuel oil of the type of fuel for the fuel tank 22. As described above, in the present embodiment, the decision operation on the fuel type confirmation image 16 is set as a requirement for unlocking. Thus, it is possible to reduce the number of erroneous operations in which unintended fuel oil is supplied to the fuel tank 22 due to the carelessness of a person.

In the present embodiment, the refueling device 1*a* is an example of a supply device and is also an example of a supply control apparatus. The image projection means 12 is an example of a display information output unit. In the present embodiment, the motion determination means 202 is an example of a supply control unit and a user operation detection unit. The fuel type confirmation image 16 is an example of display information. The fuel tank 22 is an example of a supply destination container and is an example of a tank mounted in a vehicle. The fuel oil is an example of a supply object. The decision indication information 162 is an example of decision button display.

Third Embodiment

Figure 6:
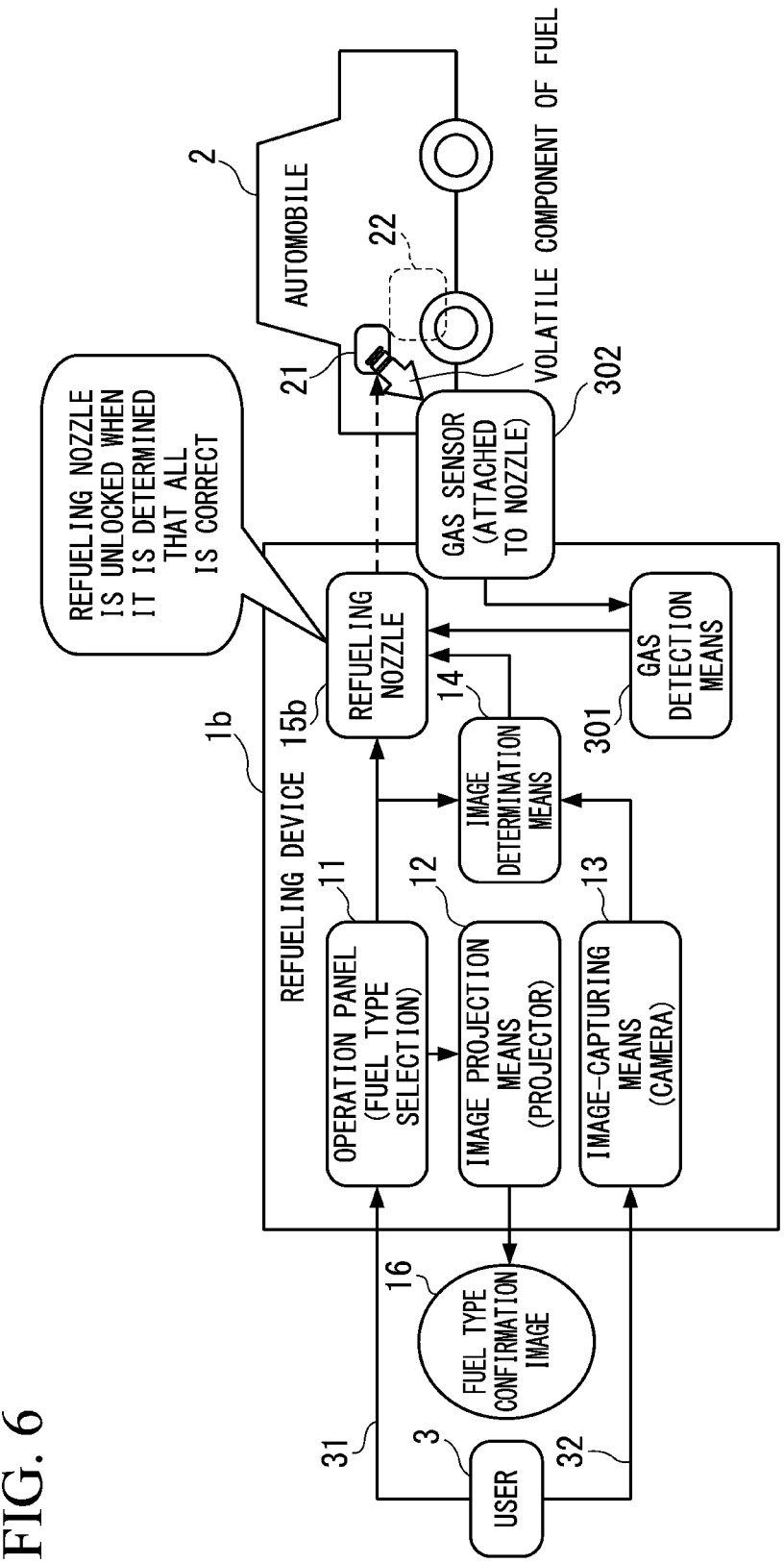
FIG. 6 is a configuration diagram showing an example of a refueling device according to a third embodiment.

FIG. 6 is a block diagram showing an example of a refueling device according to a third embodiment. The same components as those shown in FIG. 1 are denoted by the same reference signs in FIG. 6 and description thereof will be appropriately omitted. A refueling device 1b shown in FIG. 6 has the following differences from the refueling device 1 according to the first embodiment shown in FIG. 1. That is, the refueling device 1b according to the third embodiment is different from the refueling device shown in FIG. 1 in that a refueling nozzle 15b is provided instead of the refueling nozzle 15 shown in FIG. 1 and a gas detection means 301 and a gas sensor 302 are newly provided.

The gas sensor 302 is attached to, for example, the tip of the refueling nozzle 15b (the tip of a nozzle pipe 152), and outputs a detection signal according to the type of fuel oil. The gas sensor 302 can output a detection signal even while the supply is being limited (locked state). The gas detection means 301 is configured using a computer (not shown) that controls the parts in the refueling device 1 and executes the following process by executing a prescribed program in the computer. That is, the gas detection means 301 inputs the detection signal output by the gas sensor 302, generates a signal indicating the type of fuel oil detected on the basis of the input detection signal, and outputs the signal to the refueling nozzle 15b.

The refueling nozzle 15b is different from the refueling nozzle 15 in the first embodiment in terms of the following points. That is, in the present embodiment, the refueling nozzle 15b includes the following control unit. That is, the control unit provided in the refueling nozzle 15b is configured using a computer (not shown) that controls the parts in the refueling device 1 and executes the following process by executing a prescribed program in the computer. That is, the control unit provided in the refueling nozzle 15b inputs an output signal of the image determination means 14. The control unit provided in the refueling nozzle 15b inputs a signal indicating the type of fuel oil output from the gas detection means 301 and also inputs a signal indicating a type of fuel oil output by the operation panel 11. The control unit provided in the refueling nozzle 15b unlocks the refueling nozzle 15b as follows when the output signal of the image determination means 14 is a signal indicating unlocking of the refueling nozzle and a signal indicating the type of fuel oil input from the gas detection means 301 is the same a signal indicating the type of fuel oil input from the operation panel 11. That is, the control unit provided in the refueling nozzle 15b performs control for unlocking refueling from the refueling nozzle 15 by activating the refueling pump and opening the electromagnetic valve.

That is, when the image determination means 14 detects the decision operation and the gas sensor 302 detects fuel oil of the type of fuel input from the operation panel 11, the control unit unlocks the refueling nozzle 15b of the fuel oil.

Figure 7:
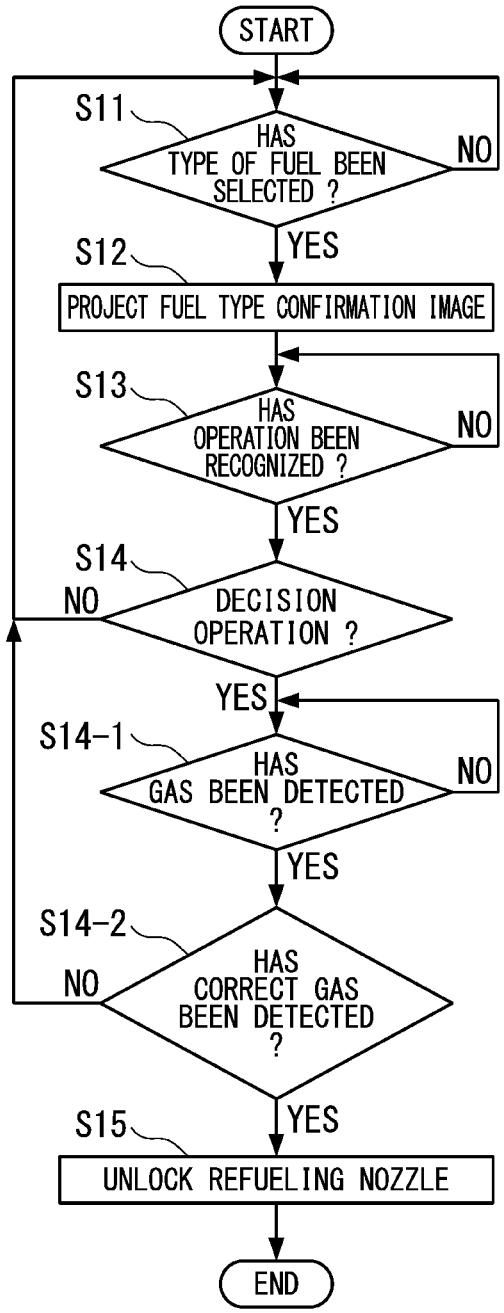
FIG. 7 is a flowchart showing an example of an operation of the refueling device shown in FIG. 6.

Next, an example of an operation of the refueling device 1b shown in FIG. 6 will be described with reference to FIG. 7. The flowchart shown in FIG. 7 shows a flow of a process executed by the refueling device 1b until the refueling nozzle 15b is unlocked after the user 3 operates the operation panel 11 to select the type of fuel. The process shown in FIG. 7 is started in a state in which the refueling nozzle 15b is locked. In the process shown in FIG. 7, the operation panel 11 first waits until the user 3 performs the operation 31 of selecting the type of fuel (the iteration of "NO" in step S11). When the operation panel 11 selects a type of fuel in accordance with an operation 31 of the user 3 ("YES" in step S11), the image projection means 12 projects a fuel type confirmation image 16 indicating the selected type of fuel (step S12).

Next, the image determination means 14 waits, on the basis of information about an image captured by the image-capturing means 13, until the prescribed operation 32 on the fuel type confirmation image 16 according to the action of the user 3 is recognized (the iteration of "NO" in step S13). The prescribed operation 32 is, for example, an action (motion) of the user 3. When the prescribed operation 32 on the fuel type confirmation image 16 according to the action of the user 3 is recognized ("YES" in step S13), the image determination means 14 determines whether or not the prescribed operation 32 on the fuel type confirmation image 16 according to the action of the user 3 is a decision operation (step S14). When the operation 32 according to the action of the user 3 on the fuel type confirmation image 16 is a decision operation (the case of "YES" in step S14), the gas detection means 301 waits until a gas (a type of fuel oil) is detected by the gas sensor 302 (the iteration of "NO" in step S14-1). Next, the refueling nozzle 15b determines whether or not the type of fuel oil indicated by the signal output by the gas detection means 301 is correct on the basis of a signal indicating the type of fuel oil output from the operation panel 11 (step S14-2). That is, the refueling nozzle 15b determines whether or not the signal indicating the type of fuel oil output from the gas detection means 301 is the same as the signal indicating the type of fuel oil output from the operation panel 11.

When the type of fuel oil indicated by the signal output by the gas detection means 301 is correct (the case of "YES" in step S14-2), the refueling nozzle 15b unlocks the refueling nozzle 15b (step S15). That is, when the signal indicating the type of fuel oil output from the gas detection means 301 is the same as the signal indicating the type of fuel oil output from the operation panel 11, the refueling nozzle 15b is unlocked. On the other hand, when the image determination means 14 determines that the operation 32 on the fuel type confirmation image 16 according to the action of the user 3 is not a decision operation (the case of "NO" in step S14), the operation panel 11 waits for the fuel type selection operation to be input again (step S11). When the refueling nozzle 15b determines that the type of fuel oil is not correct (the case of "NO" in step S14-2), the operation panel 11 waits for the fuel type selection operation to be input again (step S11).

As described above, according to the present embodiment, when fuel oil is supplied to the fuel tank 22, the image projection means 12 outputs the fuel type confirmation image 16 to allow the user 3 (the user) to recognize the selected type of fuel and decision-prompting information 161 with respect to the selected type of fuel. When an operation in which the user 3 confirming the fuel type confirmation image 16 decides on the type of fuel has been detected, the image determination means 14 outputs, to the refueling nozzle 15b, a signal indicating the removal of the supply limit for the fuel tank 22 of the fuel oil of the type of fuel. The refueling nozzle 15b is unlocked when a signal indicating the removal of the supply limit is output from the image determination means 14 and a signal indicating a type of fuel oil input from the gas detection means 301 is the same as a signal indicating a type of fuel oil input from the operation panel 11. That is, the refueling nozzle 15b detects the decision operation of the user 3 and removes the supply limit when a detection signal indicating that the gas sensor 302 detects the selected type of fuel oil is further input.

As described above, in the present embodiment, the condition that the decision operation on the fuel type confirmation image 16 matches the selected type of fuel with the detection signal of the gas sensor 302 is set as a requirement for unlocking. Thus, it is possible to prevent an erroneous operation in which unintended fuel oil is supplied to the fuel tank 22 due to the carelessness of a person.

Fourth Embodiment

Figure 8:
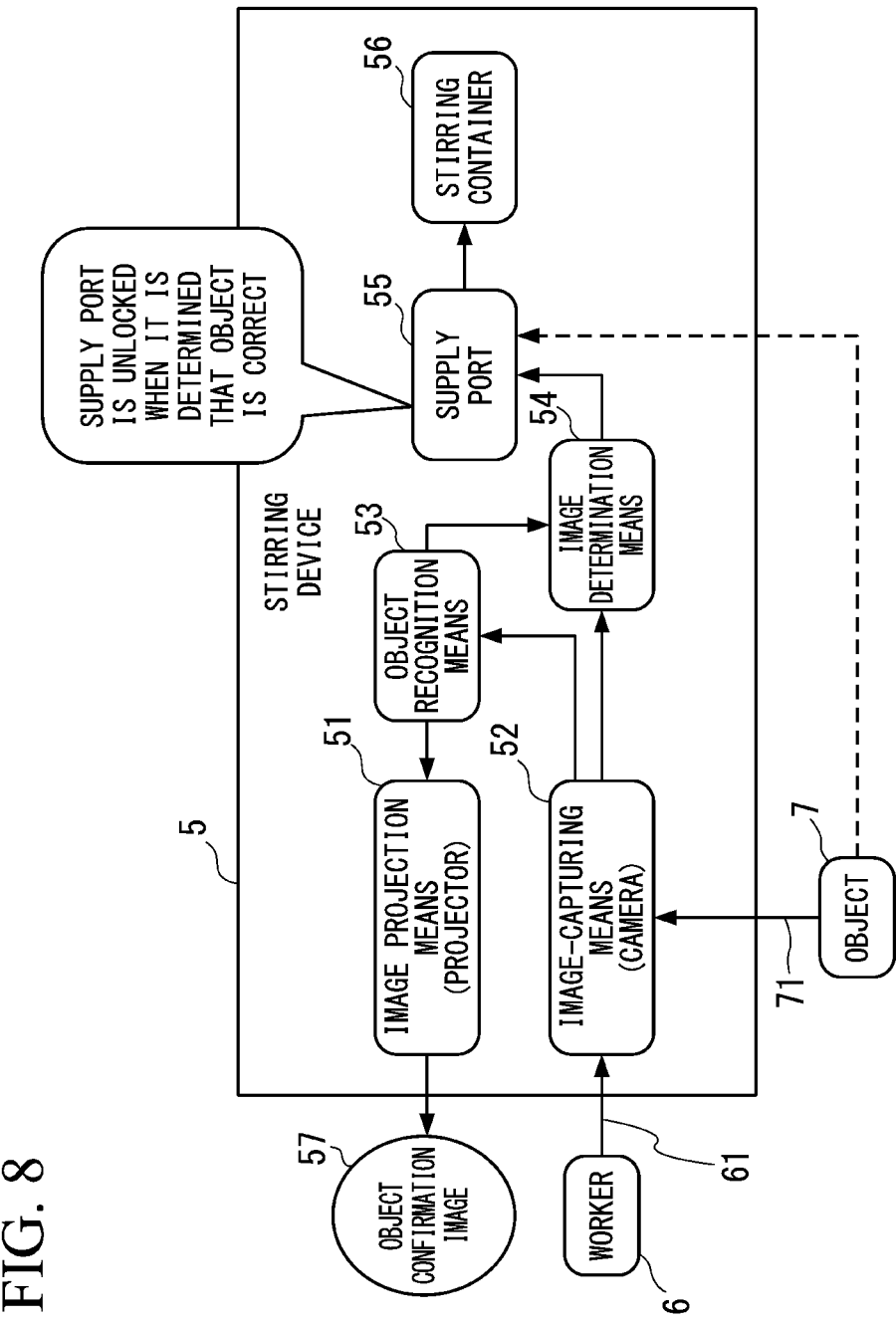
FIG. 8 is a configuration diagram showing an example of a stirring device according to a fourth embodiment.

FIG. 8 is a configuration diagram showing an example of a stirring device according to a fourth embodiment. A stirring device 5 shown in FIG. 8 is used when a worker 6 mixes and stirs a plurality of types of objects such as prescribed chemical substances. The stirring device 5 includes an image projection means 51, an image-capturing means 52, an object recognition means 53, an image determination means 54, a supply port 55, a stirring container 56, and the like.

Figure 9:
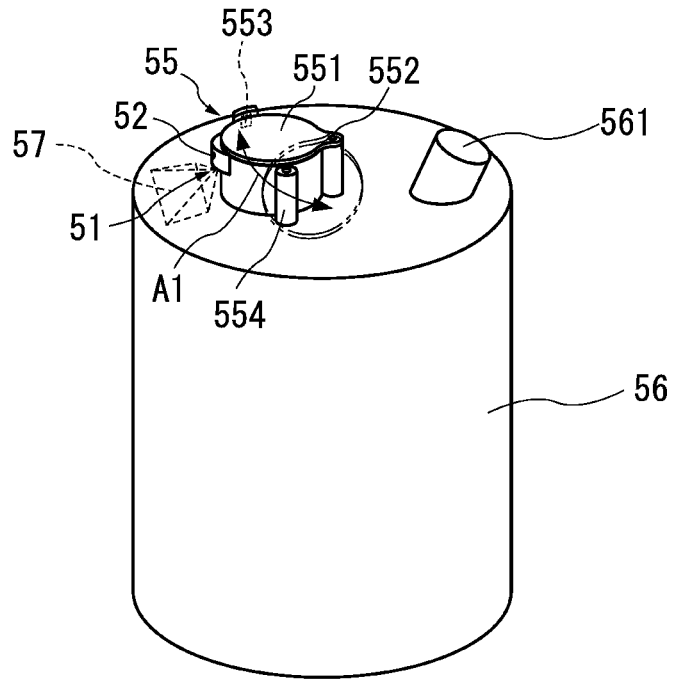
FIG. 9 is a perspective view schematically showing an example of the stirring device shown in FIG. 8.

Here, an example of the stirring container 56 shown in FIG. 8 will be described with reference to FIG. 9. FIG. 9 is a perspective view schematically showing an example of the stirring container 56. In the example of the configuration shown in FIG. 9, the stirring container 56 includes a stirring unit 561 that stirs a plurality of objects supplied within the container by rotating a stirring blade (not shown). A supply port 55 (FIG. 8) having an opening is provided at the upper part of the stirring container 56. The supply port 55 includes a lid 551 that can open and close the opening by performing rotation in a direction of an arrow A1 about a rotation shaft 552. The supply port 55 includes a sensor 553 configured to detect the closed state of the lid 551, and an actuator 554 configured to limit the rotation of the lid 551 in an opening direction. That is, the actuator 554 limits the rotation of the lid 551 in the opening direction or removes the limited rotation. In the supply port 55, the image projection means 51 (FIG. 8) is attached at a position where an object confirmation image 57 (FIG. 8) can be projected in the vicinity of the supply port 55. At the supply port 55, the image-capturing means 52 (FIG. 8) is attached at a position where the operation of the worker 6 on the object confirmation image 57 can be photographed.

The image projection means 51 is a projector configured to include, for example, a video element such as a DMD and a light source such as an LED. The image projection means 51 generates and projects the object confirmation image 57 on the basis of information about the object recognized by the object recognition means 53 (FIG. 8).

Figure 10:
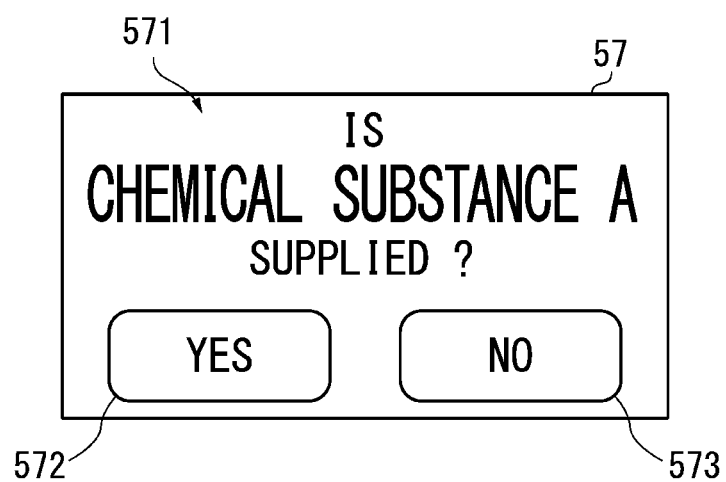
FIG. 10 is a schematic diagram showing an example of an object confirmation image shown in FIG. 8.

FIG. 10 is a schematic diagram showing an example of the object confirmation image 57 shown in FIGS. 8 and 9. The example shown in FIG. 10 shows an example of the object confirmation image 57 when the object recognition means 53 outputs an identifier of "chemical substance A". In this case, the object confirmation image 57 includes decision-prompting information 571 with respect to the object recognized by the object recognition means 53 and decision indication information 572 and denial indication information 573 that are operation objects of an operation 61 according to the action (motion) of the worker 6. In this case, the decision-prompting information 571 includes text information indicating "chemical substance A" which is an identifier of a supply object. The decision indication information 572 is an object of the operation of deciding on the object. In this case, the decision indication information 572 is a button display including text "Yes". The denial indication information 573 is an object of an operation of denying the object. In this case, the denial indication information 573 is a button display including text "No".

The image-capturing means 52 shown in FIG. 8 is configured to include, for example, a camera. The image-capturing means 52 photographs the operation 61 according to the action of the worker 6 on the object confirmation image 57 or photographs an exterior 71 of an object 7. The image-capturing means 52 outputs captured image information to the object recognition means 53 and the image determination means 54.

The object recognition means 53 is configured using, for example, a computer (not shown) that controls the parts within the stirring device 5 and executes the following process by executing a prescribed program in the computer. That is, the object recognition means 53 identifies the object 7 on the basis of image information obtained by the image-capturing means 13 photographing the object 7 and outputs an identifier which is identification information about the object 7. For example, the object recognition means 53 identifies the object 7 on the basis of an exterior image of a container of the object 7 or identifies the object 7 by reading a barcode printed on the container of the object 7. The object recognition means 53 generates information indicating the identifier of the object 7 and outputs the information to the image projection means 51 and the image determination means 54. However, the object recognition means 53 is not limited to a process of identifying the object 7 on the basis of an image recognition result. The object recognition means 53 may determine the identifier of the object 7 on the basis of, for example, an input operation of the worker 6 on the operation panel or the like.

The image determination means 54 is configured using, for example, a computer (not shown) that controls the parts in the stirring device 5 and executes the following process by executing a prescribed program in the computer. That is, the image determination means 54 inputs information about an image captured by the image-capturing means 52 and performs a process such as a prescribed image recognition process on the input image information. The image determination means 54 determines that the operation 61 of the worker 6 to decide on an object has been performed when the input image information includes the operation 61 of the worker 6 such as pointing, touching with his/her finger or hand, or viewing to designate, for example, the decision indication information 572 within the object confirmation image 57 shown in FIG. 10, as an object. On the other hand, the image determination means 54 determines that the operation 61 of the worker 6 to deny the object has been performed when the input image information includes the operation 61 of the worker 6 such as pointing, touching with a finger or hand, or viewing to designate, for example, denial indication information 573 within the object confirmation image 57 shown in FIG. 10, as an object. For example, the image determination means 54 outputs, to the supply port 55, a signal indicating unlocking of the supply port 55 on the basis of a determination result.

The supply port 55 forms an opening for supplying an object to the stirring container 56 in a state in which the lid 551 is open. The supply port 55 may include the following control unit. That is, the control unit provided in the supply port 55 is configured using, for example, a computer (not shown) that controls the parts in the stirring device 5 and executes the following process by executing a prescribed program in the computer. That is, the control unit provided in the supply port 55 performs control for locking (limiting) or unlocking a rotation operation of the lid 551 by controlling the actuator 554 on the basis of an output signal of the image determination means 54.

The stirring container 56 stirs a plurality of types of objects supplied from the supply port 55 by the stirring unit 561 shown in FIG. 9 and discharges the stirred object from a discharge port provided at the lower part of the stirring container 56 (not shown).

Figure 11:
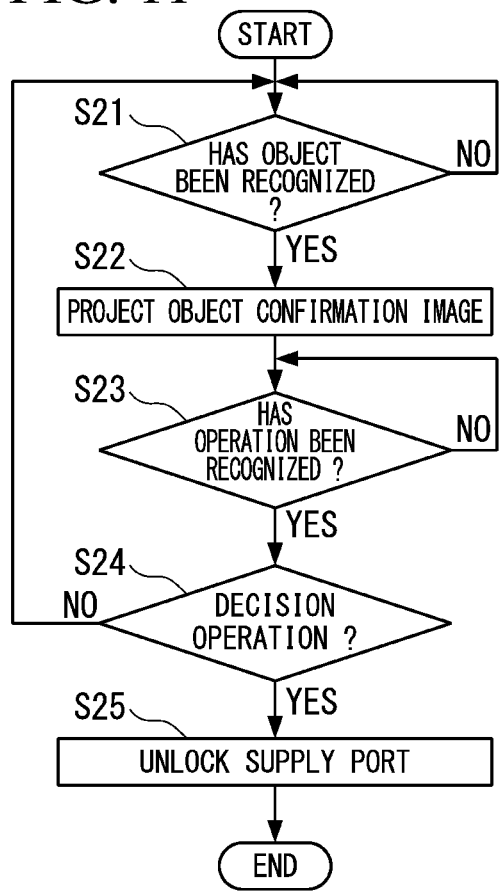
FIG. 11 is a flowchart showing an example of an operation of the stirring device shown in FIG. 8.

Next, an example of an operation of the stirring device 5 shown in FIG. 8 will be described with reference to FIG. 11. For example, the flowchart shown in FIG. 11 shows a flow of a process executed by the stirring device 5 until the supply port 55 is unlocked after the worker 6 causes the image-capturing means 52 to capture the object 7 and the object recognition means 53 recognizes the object 7. The process shown in FIG. 11 is started in a state in which the lid 551 of the supply port 55 is locked in the closed state. In the process shown in FIG. 11, the object recognition means 53 first waits until the object 7 is recognized and an identifier is generated ("NO" in step S21). When the object recognition means 53 recognizes the object 7 ("YES" in step S21), the image projection means 51 projects an object confirmation image 57 showing the recognized object (step S22).

Next, the image determination means 54 waits until a prescribed operation 61 on the object confirmation image 57 according to the action of the worker 6 is recognized on the basis of information about an image captured by the image-capturing means 52 (the iteration of "NO" in step S23). When the prescribed operation 61 on the object confirmation image 57 according to the action (motion) of the worker 6 is recognized ("YES" in step S23), the image determination means 54 determines whether or not a prescribed operation 61 on the object confirmation image 57 according to the action of the worker 6 is a decision operation (step S24). When the operation 61 on the object confirmation image 57 according to the action of the worker 6 is the decision operation (the case of "YES" in step S24), the image determination means 54 unlocks the supply port 55 (step S25). On the other hand, when the image determination means 54 determines that the operation 61 on the object confirmation image 57 according to the action of the worker 6 is not the decision operation (the case of "NO" in step S24), the object recognition means 53 waits for a new object to be recognized again (step S21).

As described above, according to the present embodiment, when an object such as a chemical substance is supplied to the stirring container 56, the image projection means 51 outputs the object confirmation image 57 to allow the worker 6 (the user) to recognize an identifier of the object and the decision-prompting information 571 with respect to the object. The image determination means 54 removes the supply limit for the stirring container 56 of the object when the operation of deciding on the object according to the worker 6 confirming the object confirmation image 57 has been detected. Thus, in the present embodiment, the decision operation on the object confirmation image 57 is set as a requirement for unlocking. Thus, it is possible to reduce the number of erroneous operations in which an unintended object is supplied to the stirring container 56 due to the carelessness of a person.

In the present embodiment, the stirring device 5 is an example of a supply device and is an example of a supply control apparatus. The image projection means 51 is an example of a display information output unit. In the present embodiment, the image determination means 54 is an example of a supply control unit and a user operation detection unit. The object confirmation image 57 is an example of display information. The stirring container 56 is an example of a supply destination container. An object is an example of a supply object. The decision indication information 572 is an example of decision button display.

The image projection means 51 is not limited to a projector and may be, for example, a display and input device such as a touch panel installed near the supply port 55. In this case, the stirring device 5 can display the object confirmation image 57 on the touch panel and unlock the supply port 55 when a touch operation on the decision indication information 572 which is decision button display has been detected. The decision operation on the object confirmation image 57 may be an operation of pushing a dedicated button for decision. In this case, the dedicated button can be installed, for example, in the vicinity of the supply port 55.

<Example of Minimum Configuration of Each Embodiment>

Figure 12:
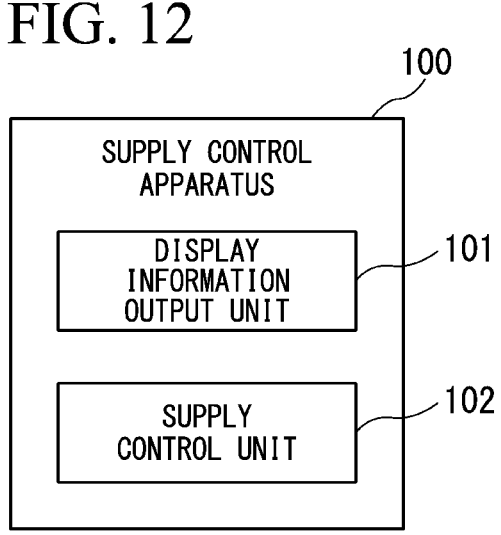
FIG. 12 is a block diagram showing a schematic basic configuration of an embodiment.

FIG. 12 is a diagram showing a minimum configuration of the supply control apparatus. As shown in FIG. 12, a supply control apparatus 100 may include at least functional units of a display information output unit 101 and a supply control unit 102. Here, the supply control apparatus 100 corresponds to the above-described refueling devices 1, 1a, and 1b and the stirring device 5. The display information output unit 101 corresponds to the image projection means 12 and the image projection means 51. The supply control unit 102 corresponds to the image determination means 14, the motion determination means 202, and the image determination means 54.

As described above, according to each embodiment and the minimum configuration example, it is possible to reduce the number of unintended erroneous operations due to the carelessness of a person. According to the present invention, the following effects can be obtained. That is, according to each embodiment, for example, by installing a projector (an image projection device), it is possible to construct an inexpensive and highly reliable erroneous refueling prevention system based on human awareness. If the user's determination action is recorded, the recorded action can be used as the proof of a determination error at the time of erroneous refueling. It is possible to use a conventional method (a gas sensor) or the like and it is possible to construct an erroneous refueling prevention system with higher accuracy in the future. Each embodiment can be applied to various fields because the each embodiment is based on human awareness and is a system to confirm a determination of the user under an environment where installation of a screen for displaying an image is conventionally difficult. For example, an application range is wide from a use scene of a general consumer to a business scene of a factory or an office including a system for preventing mixing of chlorine bleach and oxygen bleach, a system to confirm a type of gas of a gas range or a water heater (town gas and propane gas), and the like.

The embodiment is not limited to the above. For example, the display of a confirmation image (display information) may use a technique such as a stereo hologram. The number of image projection means and an attachment position thereof are not limited, and the number of image projection means may be two or more. For example, the image projection means may be attached to the tip of the refueling nozzle 15. Some or all of the programs executed by one or more computers provided in the above embodiment can be distributed via a communication line or a computer-readable recording medium.

Priority is claimed on Japanese Patent Application No. 2017-055027, filed Mar. 21, 2017, the content of which is incorporated herein by reference.

INDUSTRIAL APPLICABILITY

According to the present invention, it is possible to reduce the number of operations in which an unintended supply object is supplied to a container of a supply destination due to the carelessness of a person.

REFERENCE SIGNS LIST 1, 1a, 1b Refueling device
5 Stirring device
11 Operation panel
12, 51 Image projection means
13, 52 Image-capturing means
14, 54 Image determination means
15, 15b Refueling nozzle
16 Fuel type confirmation image
22 Fuel tank
53 Object recognition means
55 Supply port
56 Stirring container
57 Object confirmation image
161, 571 Decision-prompting information
162, 572 Decision indication information
163, 573 Denial indication information
201 Motion analysis means
202 Motion determination means
301 Gas detection means
302 Gas sensor

The invention claimed is:

1. A supply control apparatus, comprising:
a projector configured to project, in a vicinity of a supply destination container, display information to allow a user to recognize an identifier of a supply object selected by the user and information to prompt the user to decide on the selected supply object in a state in which a supply of the supply object to the supply destination container is locked; and
a processor configured to detect a decision operation for confirming the selected supply object on the display information by the user, based on an image in which an action by the user on the display information is captured or distance image information in which distance information is added, the distance information being detected by measuring distances from a plurality of points on the user and the vicinity of the user, and unlock a supply for the supply destination container of the selected supply object when the decision operation is detected.

2. The supply control apparatus according to claim 1, wherein the projector outputs the display information to allow the user to recognize an identifier of a fuel oil and decision button display to prompt the user to decide on the fuel oil when the fuel oil that is the supply object is supplied to an in-vehicle tank that is the supply destination container.

3. The supply control apparatus according to claim 1, wherein the projector outputs the display information to allow the user to recognize an identifier of a chemical substance and decision button display to prompt the user to decide on the chemical substance when the chemical substance that is the supply object is supplied to the supply destination container.

4. The supply control apparatus according to claim 1, wherein the processor detects an operation of the user with respect to decision button display to prompt the user to decide on the selected supply object included in the display information as the decision operation.

5. The supply control apparatus according to claim 1, further comprising a touch panel,
wherein the processor detects an operation of the user on decision button display to prompt the user to decide on the selected supply object included in the display information displayed on the touch panel as the decision operation.

6. The supply control apparatus according to claim 1, wherein the processor detects a detection signal, indicating a type of the supply object, output by a sensor which is attached to a nozzle for supplying the supply object, and unlocks the supply of the selected supply object if the detected detection signal indicates the selected supply object when the decision operation is detected.

7. The supply control apparatus according to claim 1, comprising a memory configured to record decision operation information indicating that the user has performed the decision operation using the display information.

8. A supply device comprising a supply control apparatus, wherein the supply control apparatus comprises:
a projector configured to project, in a vicinity of a supply destination container, display information to allow a user to recognize an identifier of a supply object selected by the user and information to prompt the user to decide on the selected supply object in a state in which a supply of the supply object to the supply destination container is locked; and
a processor configured to detect a decision operation for confirming the selected supply object on the display information by the user, based on an image in which an action by the user on the display information is captured or distance image information in which distance information is added, the distance information being detected by measuring distances from a plurality of points on the user and the vicinity of the user, and unlock a supply for the supply destination container of the selected supply object when the decision operation is detected.

9. A supply control method, comprising:
projecting, in a vicinity of a supply destination container, display information to allow a user to recognize an identifier of a supply object selected by the user and information to prompt the user to decide on the selected supply object in a state in which a supply of the supply object to the supply destination container is locked;
detecting a decision operation for confirming the selected supply object on the display information by the user, based on an image in which an action by the user on the display information is captured or distance image information in which distance information is added, the distance information being detected by measuring distances from a plurality of points on the user and the vicinity of the user; and
unlocking a supply for the supply destination container of the selected supply object when the decision operation is detected.

10. A non-transitory computer-readable recording medium storing a program that causes a computer of a supply control apparatus to execute the processes of:
projecting, in a vicinity of a supply destination container, display information to allow a user to recognize an identifier of a supply object selected by the user and information to prompt the user to decide on the selected supply object in a state in which a supply of the supply object to the supply destination container is locked;
detecting a decision operation for confirming the selected supply object on the display information by the user, based on an image in which an action by the user on the display information is captured or distance image information in which distance information is added, the distance information being detected by measuring distances from a plurality of points on the user and the vicinity of the user; and unlocking a supply for the supply destination container of the selected supply object when the decision operation is detected.

* * * * *